Sept. 20, 1927.
R. HUNTER
SEMISOFT COLLAR
Filed Aug. 10, 1925
1,642,858
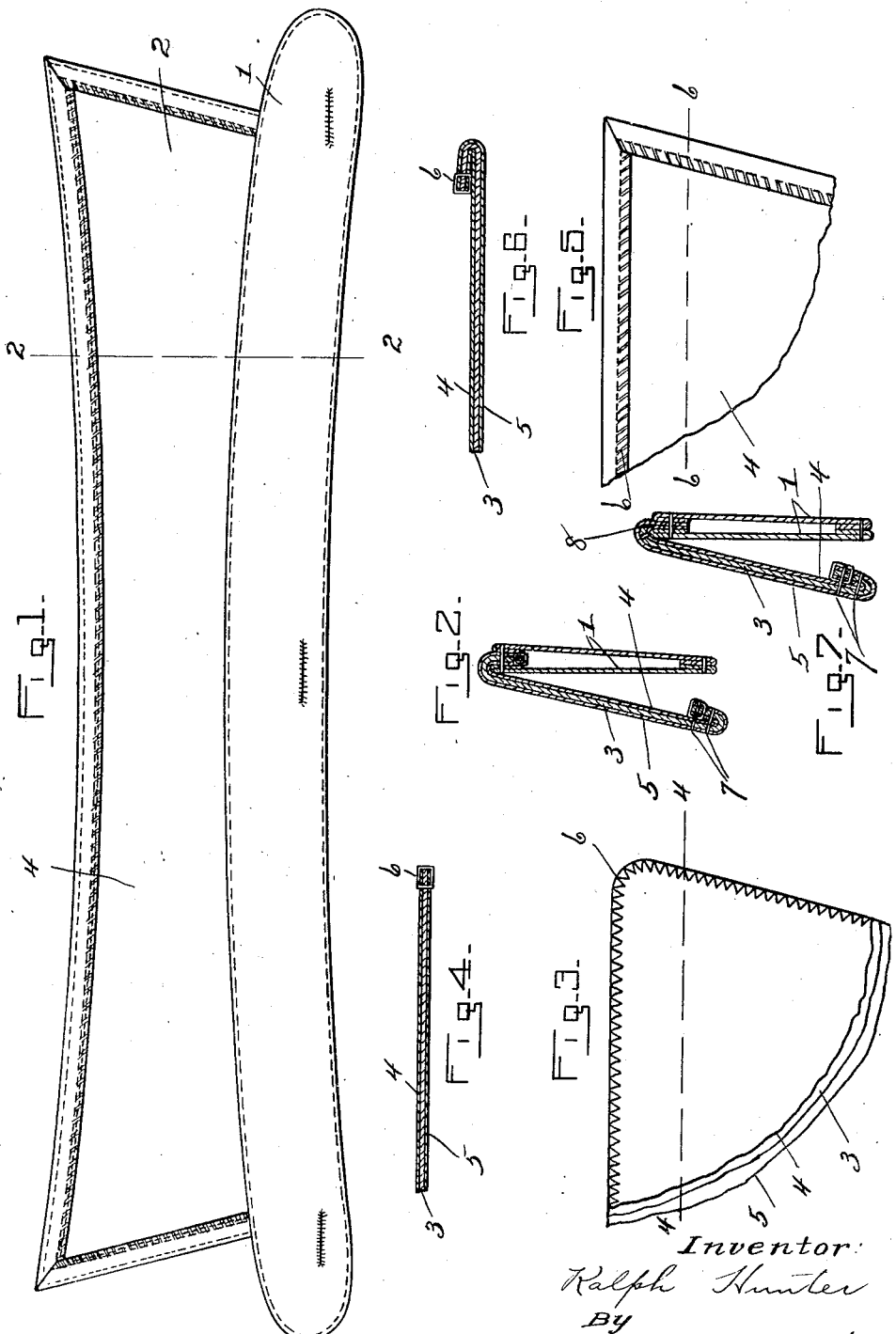

Patented Sept. 20, 1927.

1,642,858

UNITED STATES PATENT OFFICE.

RALPH HUNTER, OF NEW YORK, N. Y., ASSIGNOR TO HALL, HARTWELL & CO., INC., OF TROY, NEW YORK, A CORPORATION OF NEW YORK.

SEMISOFT COLLAR.

Application filed August 10, 1925. Serial No. 49,251.

Reference may be had to the accompanying drawings, and the reference characters marked thereon, which form a part of this specification. Similar characters refer to similar parts in the several figures therein.

The principal object of the invention is to produce a collar in which the member exposed to view in use, is made up of three or more separately cut plies of fabric, but has the appearance of a similar collar member made of a unitary fabric such as webbing or multiple-ply interwoven fabric.

Another object of the invention is to produce a collar having such a member made of three or more separately cut plies which shall have approximately the characteristics of a similar member made of said unitary fabric, of being inherently capable in an unstarched condition of receiving and maintaining a curvilinear set.

Fig. 1 of the drawings is a plan view of a fold-collar embodying my invention with the fold-over top opened out flat to expose the inner side thereof.

Fig. 2 is a cross section of the same taken on the broken line 2—2 in Fig. 1, showing the top in folded-over position.

Fig. 3 is a plan view of a broken-away portion of three plies of fabric superimposed one upon another with their edges stitched together as in the method of making a collar top in accordance with my invention.

Fig. 4 is a cross section of the same taken on the broken line 4—4 in Fig. 3.

Fig. 5 is a plan view similar to Fig. 3, showing the stitched-together edges of the plies inturned as a unit.

Fig. 6 is a cross section of the same taken on the broken line 6—6 in Fig. 5.

Fig. 7 is a view similar to Fig. 2, illustrating a modified construction of collar containing my invention.

Referring to the drawings wherein the invention is shown in preferred form, 1 is the band of the collar which may be made in any known manner.

The fold-over top of the collar is made up of an interlining ply, 3, of comparatively heavy commercially shrunk fabric flatly interposed between two flat outer plies, 4, and 5, of comparatively light commercially unshrunk fabric.

These three plies so superimposed one upon another are cut to the general form of the collar top desired with allowance for the inturning of the edges.

The plies thus cut are superimposed one upon another with their edges coincident and are secured together by stitching, 6, along or following said edges which stitching may be of any desired form, but is preferably over-edge stitching, as shown, whereby the cut edges of the plies are combined into a finished edge.

The top member having the three plies thus superimposed flatly upon one another is then subjected to a turning operation, preferably by an inturning machine, whereby the stitched-together edges of the plies are inturned as a unit from the position shown in Fig. 4, to that shown in Fig. 6.

When the plies have been thus inturned as a unit the inturned edges and the bodies of the plies are all secured together by a line of stitching, 7.

The article is thus completed for use as a top member in making a collar, which top member may be provided with a band in any known manner.

When the top member has been completed as described, it is subjected to a shrinking process which may be an ordinary laundering process, the result of which is to cause the comparatively light commercially unshrunk plies, 4 and 5, to shrink tightly upon the interposed heavy ply, 3, of commercially shrunk fabric, this operation tending to prevent or remove wrinkles from the outer plies and causing the outer plies to closely embrace between them the heavy interlining ply.

The top member thus formed has substantially the appearance of a similar top member made of a unitary piece of fabric such as multiple-ply interwoven fabric which characteristic is due to the fact that the thin outer plies are shrunk into close contact with the interlining ply. It will be understood, of course, that although the interlining ply is formed from what is known as "commercially shrunk fabric", it will have a slight shrinkage under further laundering treatment, but this shrinkage is relatively small as compared with the shrinkage which results from the laundering treatment of the outer plies, which are of commercially unshrunk material.

Before or after the completed collar top has been thus shrunk it is inserted in the usual manner in the band which is made of a plurality of plies of fabric.

The band may be made of the usual fabrics and in the usual manner, but I prefer to make the outer ply, 1ª, of the band, of the same fabric as the outer ply of the fold-over top, so that all portions of the collar exposed to view in use, will be made of the same fabric.

By having the edges of the three plies of the top member inturned as a unit, as above described, the edge portion of the top member is formed of six plies of fabric flatly superimposed one upon another, the neighboring plies being in actual contact, a result which cannot be obtained where the edges of the plies are inturned between the body portions of the plies.

In the laundering and shrinking operations, it may be desirable to use a sizing or weak solution of starch to obtain a suitable finish for the article as is almost universally practiced in the laundering of collars made of multiple-ply interwoven fabric. The amount and thickness of the starch may be varied to obtain greater or less solidity of the laundered collar.

I have described the invention as applied to the manufacture of collars, but it is also adapted for the manufacture of cuffs, bands and like articles made up of a plurality of plies of fabric.

For certain purposes of the invention, I prefer to terminate the intermediate ply, 3, in the top member, 2, approximately at the fold line of the collar as indicated at 8, in Fig. 7. This edge of the member, 3, can be finished by over-edge stitching, in the same manner as the outer edges of the top member are finished by the stitching, 6.

I do not wish to be limited to the constructions shown and above described, as, for certain purposes of the invention, various changes may be made in the form and arrangement of various parts of the device, without departing from the spirit of the invention.

What I claim as new and desire to secure by Letters Patent is:

1. A collar or the like having a member including two outside plies and an intermediate interlining ply superimposed flatly one upon another throughout substantially the extent of the body of the member with substantially coincident edges of said plies folded as a unit upon, and secured to, the body of the member.

2. A collar or the like having a member including two outside plies and an intermediate interlining ply superimposed one upon another throughout substantially the extent of the body of the member with substantially coincident edges of said plies secured together independently of the body of the member, and folded as a unit upon, and also secured to, the body of the member 3. That improvement in the art of making collars and like articles which consists in superimposing flatly one upon another with coincident edges, and securing together along their coincident edges, two outer plies, and an intermediate ply having a lower coefficient of shrinkage than said outer plies, and subjecting the article to a shrinkage process.

4. That improvement in the art of making collars and like articles which consists in superimposing flatly one upon another two outer plies of commercially unshrunk fabric and an intermediate ply of commercially shrunk fabric, and subjecting the article to a shrinking process.

5. That improvement in the art of making collars and like articles which consists in superimposing flatly one upon another with substantially coincident edges two outer plies, and an intermediate ply having a lower coefficient of shrinkage than said outer plies, securing together the substantially coincident edges of said outer plies and said intermediate ply, folding said secured-together edges of said plies as a unit upon, and securing them to, the body of the article and subjecting the article to a shrinking process.

6. As a new article of manufacture, a collar having a flap including two outside plies and an intermediate ply superimposed flatly one upon another throughout substantially the extent of the body of the flap, the intermediate ply having a relatively smaller coefficient of shrinkage than the outer plies, said flap member being laundered and thereby having the outer plies shrunk on the intermediate ply by unitary shrinkage of the flap, whereby the outside plies are in intimate contact with the intermediate ply throughout substantially the extent of the flap.

7. As a new article of manufacture, a collar having a flap member including two outside plies and an intermediate ply superimposed flatly one upon another throughout substantially the extent of the body of the flap with substantially coincident edges of said plies secured together independently of the body of the flap member and folded upon as a unit and also secured to the body of the flap member, said intermediate ply having a lower coefficient of shrinkage than the outer plies, and the flap being laundered and thereby having the outer plies shrunk on the intermediate ply by shrinkage of the flap as a unit, whereby the plies are in intimate contact throughout substantially the extent of the body of the flap.

In testimony whereof, I have hereunto set my hand this 21st day of July, 1925.

RALPH HUNTER.